United States Patent
Furukawa et al.

(10) Patent No.: US 7,107,120 B2
(45) Date of Patent: Sep. 12, 2006

(54) APPARATUS AND METHOD FOR CONTROLLING INTER-PROCESS BUFFER, AND PROGRAM AND STORAGE MEDIUM REALIZING THE SAME

(75) Inventors: Satomi Furukawa, Kawasaki (JP); Shozo Suzuki, Kawasaki (JP); Hiroshi Oide, Kawasaki (JP)

(73) Assignee: Fujitsu Limited, Kawasaki (JP)

( * ) Notice: Subject to any disclaimer, the term of this patent is extended or adjusted under 35 U.S.C. 154(b) by 672 days.

(21) Appl. No.: 10/259,154

(22) Filed: Sep. 27, 2002

(65) Prior Publication Data

US 2003/0187910 A1 Oct. 2, 2003

(30) Foreign Application Priority Data

Mar. 29, 2002 (JP) .............................. 2002-095081

(51) Int. Cl.
G06F 7/00 (2006.01)
G06F 19/00 (2006.01)
G05B 11/01 (2006.01)
G05B 13/02 (2006.01)
G04F 1/00 (2006.01)

(52) U.S. Cl. .......................... 700/214; 700/14; 700/34; 700/35; 700/51; 700/54; 700/67; 700/68; 700/95; 700/112; 414/900; 702/176; 702/179; 702/180; 702/199

(58) Field of Classification Search .................. 700/14, 700/28, 32–34, 35, 51, 54, 67, 68, 95–97, 700/112, 117, 121, 213, 214; 414/900; 702/176, 702/179, 180, 199
See application file for complete search history.

(56) References Cited

U.S. PATENT DOCUMENTS 5,229,948 A * 7/1993 Wei et al. ...................... 700/99
5,373,451 A * 12/1994 Furukawa .................... 700/228
6,643,556 B1 * 11/2003 Morenz et al. ............. 700/106

FOREIGN PATENT DOCUMENTS

JP 06-251028 9/1994

* cited by examiner

*Primary Examiner*—Leo Picard
*Assistant Examiner*—Sean Shechtman
(74) *Attorney, Agent, or Firm*—Katten Muchin Rosenman LLP

(57) ABSTRACT

An object of the invention is to minimize the number of in-process items. To this end, in an inter-process buffer controlling apparatus according to the invention, the size of a buffer to be used for storage of work subjects of predetermined work is increased if a difference or a ratio between a variance of first intervals at which the work subjects are delivered to the buffer and a variance of duration that is taken for the preceding process exceeds a prescribed first threshold value, and the size of the buffer is decreased if a difference or a ratio between an average of second intervals at which work subjects generated by the work are delivered to the following buffer and an average of the first intervals exceeds a prescribed second threshold value.

18 Claims, 13 Drawing Sheets

FIG. 7

| PROCESS IDENTIFIER | PRODUCT IDENTIFIER | DELIVERY TIME | NUMBER OF COMPLETED ITEMS |
|---|---|---|---|
| | | | |
| ⋮ | ⋮ | ⋮ | ⋮ |

| PROCESS IDENTIFIER | PRODUCT IDENTIFIER | START TIME | END TIME | WORK TIME | NUMBER OF COMPLETED ITEMS |
|---|---|---|---|---|---|
| ... | ... | ... | ... | ... | ... |

32

F I G. 12c
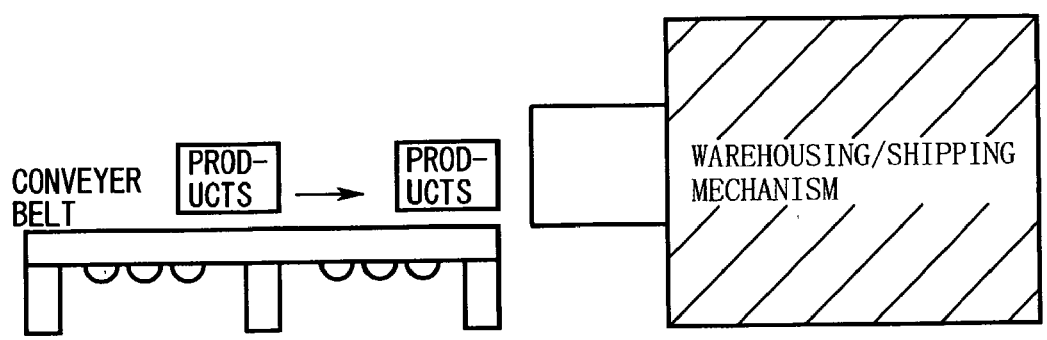
F I G. 12d
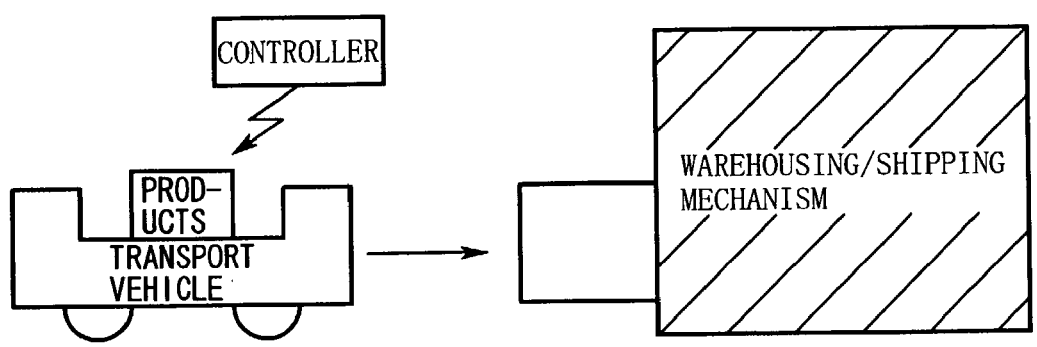

APPARATUS AND METHOD FOR CONTROLLING INTER-PROCESS BUFFER, AND PROGRAM AND STORAGE MEDIUM REALIZING THE SAME

BACKGROUND OF THE INVENTION

1. Field of the Invention

The present invention relates to an inter-process buffer controlling apparatus and method in which the size of an inter-process buffer for storing work subjects of a process is varied in a system in which a work is done through a plurality of processes, as well as to a program and a storage medium for realizing such an apparatus and a method.

2. Description of the Related Art

The Kanban System is known as a typical conventional system for reducing the number of in-process items. In this system, the number of in-process items is minimized because each process is executed in accordance with requirements that are given by the following process.

In this system, desired production is attained and the capacity utilization ratios of respective processes are kept high if tact balance among the processes is kept and the number of items being processed is relatively stable. However, in large-item-small-scale, custom-manufacturing production lines, the capacity utilization ratio and the production per unit time of a process concerned may lower to a large extent because not only a variation in actual tact time but also other various variations such as variations in amount and time due to the demand of customers and a variation relating to collection of parts occur depending on a product mix at each time. The term "actual tact time" means actual work time that is taken for each product in the process concerned rather than man-hours that is in proportion to the number of operators. The term "product mix" means a combination of products including their proportion and flowing order.

The TOC (theory of constrain) and the DBR (drum buffer rope) methods are known as methods for solving the above problems.

In these methods, inputting items to a production line in accordance with the capacity of a process (bottleneck process) having a lowest manufacturing capacity in the process prevents manufacture of unnecessary in-process items. And production is maintained by providing, at proper positions, a buffer having a certain capacity which prevents further reduction in the capacity of the bottleneck process due to suspension or a slowdown of operation that is caused from variations.

Incidentally, in the above conventional methods, a bottleneck process itself is not fixed and in many cases production is not maintained satisfactorily in the case where the product mix or the demand of customers varies to a large extent.

Further, in recent years, for many of products as subjects of large-item-small-scale production, shortening of a manufacturing period has come to be required strictly and the estimation of demand has become more difficult.

Therefore, not only a measure to minimize loss of variations in demand but also a measure to accommodate needs of customers should be provided urgently. A technique for further reducing the number of in-process items and actual process time with reliability without hindering reduction in the manufacturing cost is desired strongly. The term "actual process time" means time that is taken actually from a start to an end of each process and may include a time during which no work is done actually.

SUMMARY OF THE INVENTION

An object of the present invention is to provide an apparatus and a method for controlling an inter-process buffer which realize smooth adaptation to a permutation of a variety of work subjects that may vary to a large extent, keep a high and stable total efficiency, and minimize the number of in-process items during every process, it is also to provide a program and a storage medium realizing such an apparatus and a method.

Another object of the invention is to keep the size of each buffer provided between processes at such a proper value to prevent both of occurrence of a standby state during the preceding process and an undue increase in the number of work subjects to be delivered to the succeeding process, even in the case where the permutation of work subjects and the time taken for each process may vary.

Another object of the invention is to reliably keep the amount or number of work subjects delivered to a buffer at such a value to prevent both of occurrence of a standby state during the preceding process and an undue increase in the number of work subjects to be delivered to the succeeding process, even in the case where an operator of the preceding process delivers work subjects to the buffer and the permutation of work subjects delivered to the preceding process and the time taken for each process may vary.

Another object of the invention is to quickly update the sizes of buffers provided between processes to such a proper value to avoid occurrence of a standby state during the preceding process even in the case where the permutation of work subjects or the time taken for the preceding process has varied suddenly.

Another object of the invention is to quickly update the sizes of buffers provided between processes to such a proper value to prevent an undue increase in the number of work subjects to be delivered to the succeeding process even in the case where the permutation of work subjects or the time taken for the preceding process has varied suddenly.

Another object of the invention is to reliably keep the size of a buffer at such a proper value to prevent both of occurrence of a standby state during the preceding process and an undue increase in the number of work subjects to be delivered to the succeeding process, even in the case where an existing system does not provide a variance and an average of first intervals, a variance of time taken for the preceding process, and an average of second intervals.

Still another object of the invention is to realize flexible adaptation to a variety of work plans.

Yet another object of the invention is to realize flexible adaptation to various forms of division of work done during processes and various forms of subjects of the division of work.

A further object of the invention is to realize smooth adaptation to a variety of work subjects, to keep a high and stable total efficiency, and to minimize the number of in-process items during every process in a system to which the present invention is applied and in which a division of work is done, without causing any basic alterations to work procedures and facilities in each process.

The invention provides an inter-process buffer controlling apparatus in which the size of a buffer, which is provided between a preceding process and a process concerned, is increased when a difference or a ratio between a variance of first intervals and a variance of duration taken for the preceding process exceeds a prescribed first threshold value, the first intervals being intervals with which subjects of work to be done in the preceding process are delivered to the buffer, the duration being a duration taken for the preceding process in which the work subjects are generated and delivered to the buffer, and in which the size of the buffer is decreased when a difference or a ratio between an average of second intervals with which a result of the work is delivered to a buffer provided immediately downstream of the process concerned, and an average of the first intervals exceeds a prescribed second threshold value.

In this inter-process buffer controlling apparatus, the size of the buffer is kept at a value which satisfies both of the following conditions:

The variance of intervals with which work subjects are delivered from the preceding process does not exceed, by the first threshold value or more, the variance of work times taken for the preceding process.

The average of intervals with which work subjects are delivered from the preceding process to the buffer does not exceed, by the second threshold value or more, the average of intervals with which work subjects are delivered from the following process to the following buffer.

The size of the buffer may be increased by a value that is given as a monotone increasing function or a non-decreasing function of a difference or a ratio between the difference or ratio between the variance of the first intervals and the variance of the duration taken for the preceding process, and the prescribed first threshold value.

In this inter-process buffer controlling apparatus, the size of the buffer is substantially increased as the difference between the variance of the intervals with which work subjects are delivered from the preceding process and the variance of work times taken for the preceding process becomes larger than the first threshold value.

The size of the buffer may be decreased by a value that is given as a monotone decreasing function or a non-increasing function of a difference or a ratio between the difference or ratio between the average of the second intervals and the average of the first intervals, and the prescribed second threshold value.

In this inter-process buffer controlling apparatus, the size of the buffer is substantially decreased as the difference between the average of the intervals with which work subjects are delivered from the preceding process and the average of the intervals with which work subjects are delivered from the following process to the following buffer becomes larger than the second threshold value.

The buffer size may be notified to an operator.

In this inter-process buffer controlling apparatus, the size of the buffer at a value satisfying both of the following conditions is notified to the operator:

The variance of intervals with which work subjects are delivered from the preceding process does not exceed, by the first threshold value or more, the variance of work times taken for the preceding process.

The average of intervals with which work subjects are delivered from the preceding process to the buffer does not exceed, by the second threshold value or more, the average of intervals with which work subjects are delivered from the following process to the following buffer.

The amount of work subjects allowed to be stored in the buffer may be increased (updated) by a value that is given as a monotone increasing function or a non-decreasing function of a difference or a ratio between the difference or ratio between the variance of the first intervals and the variance of the duration taken for the preceding process, and the prescribed first threshold value.

In this inter-process buffer controlling apparatus, the size of the buffer is substantially increased as the difference between the variance of the intervals with which work subjects are delivered from the preceding process and the variance of work times taken for the preceding process becomes larger than the first threshold value.

The amount of work subjects allowed to be stored in the buffer may be decreased (updated) by a value that is given as a monotone decreasing function or a non-increasing function of a difference or a ratio between the difference or ratio between the average of the second intervals and the average of the first intervals, and the prescribed second threshold value.

In this inter-process buffer controlling apparatus, the size of the buffer to be notified to the operator is updated to a smaller value as the difference between the average of the intervals with which work subjects are delivered from the preceding process and the average of the intervals with which work subjects are delivered from the following process to the following buffer becomes larger than the second threshold value.

The inter-process buffer controlling apparatus may further comprise a statistical processing section for repeatedly determining the variance and average of the first intervals, the variance of the duration that is taken for the preceding process, and the average of the second intervals.

In this inter-process buffer controlling apparatus, the size of the buffer is kept, with reliability, at such a proper value as to prevent both of occurrence of a standby state in the preceding process and an undue increase in the number of work subjects to be delivered to the following process, even in the case where an existing system does not provide the variance and average of the first intervals, the variance of the duration taken for the preceding process, and the average of the second intervals.

The statistical processing section may repeatedly determine the variance and average of the first intervals, the variance of the duration that is taken for the preceding process, and the average of the second intervals at a frequency suitable for a prescribed schedule.

In this inter-process buffer controlling apparatus, the size of the buffer is kept at a proper value as long as the above-mentioned frequency is given with desired accuracy at a value suitable for the combination of work subjects in the preceding process even in the case where the combination of work subjects vary.

The statistical processing section may repeatedly determine the variance and average of the first intervals, the variance of the duration that is taken for the preceding process, and the average of the second intervals at a frequency suitable for a permutation of the work subjects.

In this inter-process buffer controlling apparatus, the size of the buffer is kept at a proper value as long as the above-mentioned frequency is given with desired accuracy at a value suitable for the combination of work subjects in the preceding process even in the case where the combination of work subjects vary.

The variance and average of the first intervals, the variance of the duration that is taken for the preceding process, and the average of the second intervals may be determined for each element of the work subjects.

In this inter-process buffer controlling apparatus, the invention is applicable with reliability even in the case where one or both of the number of work subjects to be done in the preceding process and the number of work subjects to be delivered to the buffer from the preceding process is/are not singular or the two numbers are different from each other.

The variance and average of the first intervals, the variance of the duration that is taken for the preceding process, and the average of the second intervals may be determined for each lot of the work subjects stored in the buffer.

In this inter-process buffer controlling apparatus, the invention is applicable with reliability as long as the lots are properly recognized, even in the case where one or both the number of work subjects to be done in the preceding process and the number of work subjects to be delivered to the buffer from the preceding process is/are not constant nor singular.

The variance and average of the first intervals, the variance of the duration that is taken for the preceding process, and the average of the second intervals may be determined for each unit of delivery of the work subjects to the buffer.

In this inter-process buffer controlling apparatus, the invention is applicable with reliability as long as the lots are properly recognized even in the case where one or both the number of work subjects to be done in the preceding process and the number of work subjects to be delivered to the buffer from the preceding process is/are not constant nor singular.

The invention also provides a program for causing a computer to operate as all or part of the sections that constitute any of the above inter-process buffer controlling apparatuses as well as a computer-readable recording medium on which such a program is recorded.

With the above program and recording medium according to the invention, a computer that executes the program serves as a component of any of the above inter-process buffer controlling apparatuses.

BRIEF DESCRIPTION OF THE DRAWINGS

The nature, principle, and utility of the invention will become more apparent from the following detailed description when read in conjunction with the accompanying drawings in which like parts are designated by identical reference numbers, in which:

FIG. 7 shows the structure of an actual tact time management table;

FIG. 8 shows the structure of a work time management table;

FIGS. 11A and 11B and FIGS. 12A to 12D show various examples of an inter-process buffer.

DESCRIPTION OF THE PREFERRED EMBODIMENTS

First, the principles of the present invention will be described with reference to FIG. 1.

Figure 1:
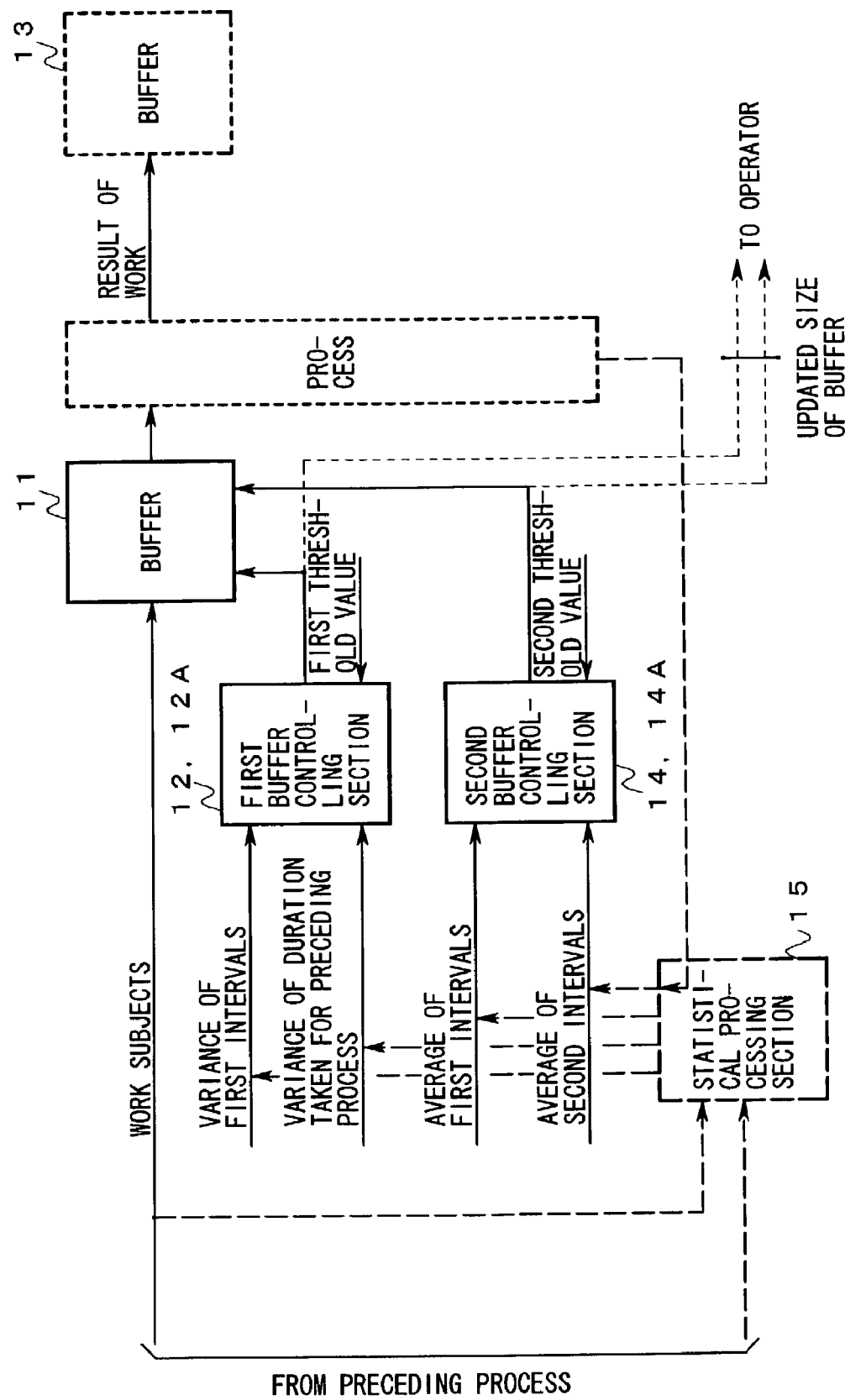
FIG. 1 is a block diagram showing the principles of the present invention.

FIG. 1 is a block diagram showing the principle of the invention. Inter-process buffer controlling apparatuses shown in FIG. 1 are composed of (part of) buffers 11 and 13, a first buffer controlling section 12 or 12A, a second buffer controlling section 14 or 14A, and a statistical processing section 15.

The principle of a first inter-process buffer controlling apparatus according to the invention is as follows.

The size of the buffer 11 is increased (by the first buffer controlling section 12) if a difference or a ratio between a variance of first intervals at which subjects of predetermined work are delivered to the buffer 11 and a variance of duration taken for the preceding process in which the subjects are generated and delivered to the buffer 11 exceeds a prescribed first threshold value. The size of the buffer 11 is decreased (by the second buffer controlling section 14) if a difference or a ratio between an average of second intervals at which a result of the predetermined work is delivered to the following buffer 13 and an average of the first intervals exceeds a prescribed second threshold value.

In this inter-process buffer controlling apparatus, the size of the buffer 11 is kept at a value which satisfies both of the following conditions:

The variance of intervals at which work subjects are delivered from the preceding process does not exceed the variance of work times for the preceding process by the first threshold value or more.

The average of intervals at which work subjects are delivered from the preceding process to the buffer 11 does not exceed the average of intervals at which work subjects are delivered from the process concerned to the following buffer 13 by the second threshold value or more.

Therefore, even in the case where the permutation of work subjects and the duration taken for each process may vary in a variety of manners, the size of the buffer 11 provided between processes is kept at such a proper value as to prevent both of occurrence of a unnecessary standby state in the preceding process and an undue increase in the number of work subjects to be delivered to the process concerned.

The principle of a second inter-process buffer controlling apparatus according to the invention is as follows.

The amount or number of work subjects, which is notified to an operator and allowed to be stored in the buffer 11, which is to be used for storage of subjects of predetermined work, is updated to a larger value (by the first buffer controlling section 12A) if a difference or a ratio between a variance of first intervals at which the work subjects are delivered to the buffer 11 and a variance of duration taken for the preceding process in which the work subjects are generated and delivered to the buffer 11 exceeds a prescribed first threshold value. The amount or number of work subjects is updated to a smaller value (by the second buffer controlling section 14A) if a difference or a ratio between an average of second intervals at which a result of the work is delivered to the following buffer 13 and an average of the first intervals exceeds a prescribed second threshold value.

In this inter-process buffer controlling apparatus, the buffer 11 has a size at a value which is notified to the operator and satisfies both of the following conditions:

The variance of intervals at which work subjects are delivered from the preceding process does not exceed the variance of work times for the preceding process by the first threshold value or more.

The average of intervals at which work subjects are delivered from the preceding process to the buffer 11 does not exceed the average of intervals at which work subjects are delivered from the process concerned to the following buffer 13 by the second threshold value or more.

Therefore, it is possible to reliably keep the amount or number of work subjects delivered to the buffer 11 at such a value to prevent occurrence of a standby state during the preceding process and an undue increase in the number of work subjects to be delivered to the succeeding process, even in the case where an operator of the preceding process delivers work subjects to the buffer 11 and the permutation of work subjects delivered to the preceding process and the duration taken for each process may vary.

The principle of a third inter-process buffer controlling apparatus according to the invention is as follows.

The first buffer controlling section 12 increases the size of the buffer 11 by a value that is given as a monotone increasing function or a non-decreasing function of a difference or a ratio between the difference or ratio between the variance of the first intervals and the variance of the duration taken for the preceding process and the prescribed first threshold value.

In this inter-process buffer controlling apparatus, the size of the buffer 11 is more increased as the difference between the variance of intervals at which work subjects are delivered from the preceding process and the variance of work times for the preceding process becomes larger than the first threshold value.

Therefore, the size of the buffer 11 provided between processes is updated quickly to such a proper value as to avoid a standby state in the preceding process even in the case where the permutation of work subjects or the duration taken for the preceding process has varied suddenly.

The principle of a fourth inter-process buffer controlling apparatus according to the invention is as follows.

The second buffer controlling section 14 decreases the size of the buffer 11 by a value that is determined according a monotone decreasing function or a non-increasing function of a difference or a ratio between the difference or ratio between the average of the second intervals and the average of the first intervals and the prescribed second threshold value.

In this inter-process buffer controlling apparatus, the size of the buffer 11 is more decreased as the difference between the average of intervals at which work subjects are delivered from the preceding process to the buffer 11 and the average of intervals at which work subjects are delivered from the process concerned to the following buffer 13 becomes larger than the second threshold value.

Therefore, the size of the buffer 11 provided between processes is updated quickly to such a proper value as to avoid an undue increase in the number of work subjects to be delivered to the process concerned even in the case where the permutation of work subjects or the duration taken for the preceding process has varied suddenly.

The principle of a fifth inter-process buffer controlling apparatus according to the invention is as follows.

The first buffer controlling section 12A increases (updates) the amount or number of work subjects to be stored in the buffer 11 by a value that is given as a monotone increasing function or a non-decreasing function of a difference or a ratio between the difference or ratio between the variance of the first intervals and the variance of the duration taken for the preceding process and the prescribed first threshold value.

In this inter-process buffer controlling apparatus, the size of the buffer 11 to be notified to the operator is more increased as the difference between the variance of intervals at which work subjects are delivered from the preceding process and the variance of work times for the preceding process becomes larger than the first threshold value.

Therefore, the size of the buffer 11 provided between processes is updated quickly to such a proper value as to avoid a standby state in the preceding process even in the case where the permutation of work subjects or the duration taken for the preceding process has varied suddenly.

The principle of a sixth inter-process buffer controlling apparatus according to the invention is as follows.

The second buffer controlling section 14A decreases (updates) the amount or number of work subjects to be stored in the buffer 11 by a value that is determined according a monotone decreasing function or a non-increasing function of a difference or a ratio between the difference or ratio between the average of the second intervals and the average of the first intervals and the prescribed second threshold value.

In this inter-process buffer controlling apparatus, the size of the buffer 11 to be notified to the operator is updated to a smaller value as the difference between the average of intervals at which work subjects are delivered from the preceding process to the buffer 11 and the average of intervals at which work subjects are delivered from the process concerned to the following buffer 13 becomes larger than the second threshold value.

Therefore, the size of the buffer 11 provided between processes is updated quickly to such a proper value as to avoid an undue increase in the number of work subjects to be delivered to the process concerned even in the case where the permutation of work subjects or the duration taken for the preceding process has varied suddenly.

The principle of a seventh inter-process buffer controlling apparatus according to the invention is as follows.

The statistical processing section 15 repeatedly determines the variance and average of the first intervals, the variance of the duration taken for the preceding process, and the average of the second intervals.

In this inter-process buffer controlling apparatus, the size of the buffer 11 is kept, with high reliability, at such a proper value as to avoid both of a standby state in the preceding process and an undue increase in the number of work subjects to be delivered to the process concerned, even in the case where an existing system does not provide the variance and average of the first intervals, the variance of the duration that is taken for the preceding process, and the average of the second intervals.

The principle of an eighth inter-process buffer controlling apparatus according to the invention is as follows.

The statistical processing section 15 repeatedly determines the variance and average of the first intervals, the variance of the duration taken for the preceding process, and the average of the second intervals at a frequency suitable for a prescribed schedule.

In this inter-process buffer controlling apparatus, the size of the buffer 11 is kept at a proper value as long as the above-mentioned frequency is given with desired accuracy as a value suitable for combination of work subjects of the preceding process even in the case where the combination of work subjects vary in a variety of manners.

This makes it possible to adapt to a variety of work plans compared to the case where the frequency is constant.

The principle of a ninth inter-process buffer controlling apparatus according to the invention is as follows.

The statistical processing section 15 repeatedly determines the variance and average of the first intervals, the variance of the duration taken for the preceding process, and the average of the second intervals at a frequency that is suitable for a permutation of the work subjects.

In this inter-process buffer controlling apparatus, the size of the buffer 11 is kept at a proper value as long as the above-mentioned frequency is given with desired accuracy at a value suitable for combination of work subjects of the preceding process even in the case where the combination of work subjects vary in a variety of manners.

This makes it possible to adapt to a variety of work plans compared to the case where the frequency is constant.

The principle of a 10th inter-process buffer controlling apparatus according to the invention is as follows.

The variance and average of the first intervals, the variance of the duration that is taken for the preceding process, and the average of the second intervals are calculated for each element of the work subjects.

In this inter-process buffer controlling apparatus, the invention is applicable with high reliability even in the case where one or both of the number of the work subjects of the preceding process and the number of work subjects delivered to the buffer 11 from the preceding process are not singular or the two numbers are different from each other.

This realizes flexible adaptation to various forms of division of work done during processes and various forms of subjects of the division of work.

The principle of an 11th inter-process buffer controlling apparatus according to the invention is as follows.

The variance and average of the first intervals, the variance of the duration taken for the preceding process, and the average of the second intervals are calculated for each lot of the work subjects stored in the buffer 11.

In this inter-process buffer controlling apparatus, the invention is applicable with high reliability even in the case where one or both of the number of the work subjects of the preceding process and the number of work subjects delivered to the buffer 11 from the preceding process are not fixed nor singular as long as the lots are reliably recognized.

This realizes flexible adaptation to various forms of division of work done during processes and various forms of subjects of the division of work.

The principle of a 12th inter-process buffer controlling apparatus according to the invention is as follows.

The variance and average of the first intervals, the variance of the duration taken for the preceding process, and the average of the second intervals are calculated for each unit of delivery of the work subjects to the buffer 11.

In this inter-process buffer controlling apparatus, the invention is applicable with high reliability even in the case where one or both of the number of the work subjects of the preceding process and the number of work subjects delivered to the buffer 11 from the preceding process are not fixed or nor singular as long as the lots are reliably recognized.

This realizes flexible adaptation to various forms of division of work done during processes and various forms of subjects of the division of work.

The principle of a program according to the invention is as follows.

A program causes a computer to function as all or part of the first buffer controlling section 12 or 12A, the second buffer controlling section 14 or 14A, and the statistical processing section 15 that constitute any of the above inter-process buffer controlling apparatuses.

Therefore, the computer that executes the program according to the invention serves as a component of the inter-process buffer controlling apparatus according to the invention.

The principle of a storage medium according to the invention is as follows.

A program for causing a computer to function as all or part of the first buffer controlling section 12 or 12A, the second buffer controlling section 14 or 14A, and the statistical processing section 15 that constitute any of the above inter-process buffer controlling apparatuses is recorded on a storage medium, which is computer-readable.

Such a program is software to be executed by the computer or a microprogram incorporated in the computer, and can be recorded for distribution on a recording medium which is separate and detachable from the computer.

Therefore, the computer that reads such a program from the recording medium of the invention and executes it serves as a component of the inter-process buffer controlling apparatus of the invention.

An embodiment of the invention will be hereinafter described in detail with reference to the drawings.

Figure 2:
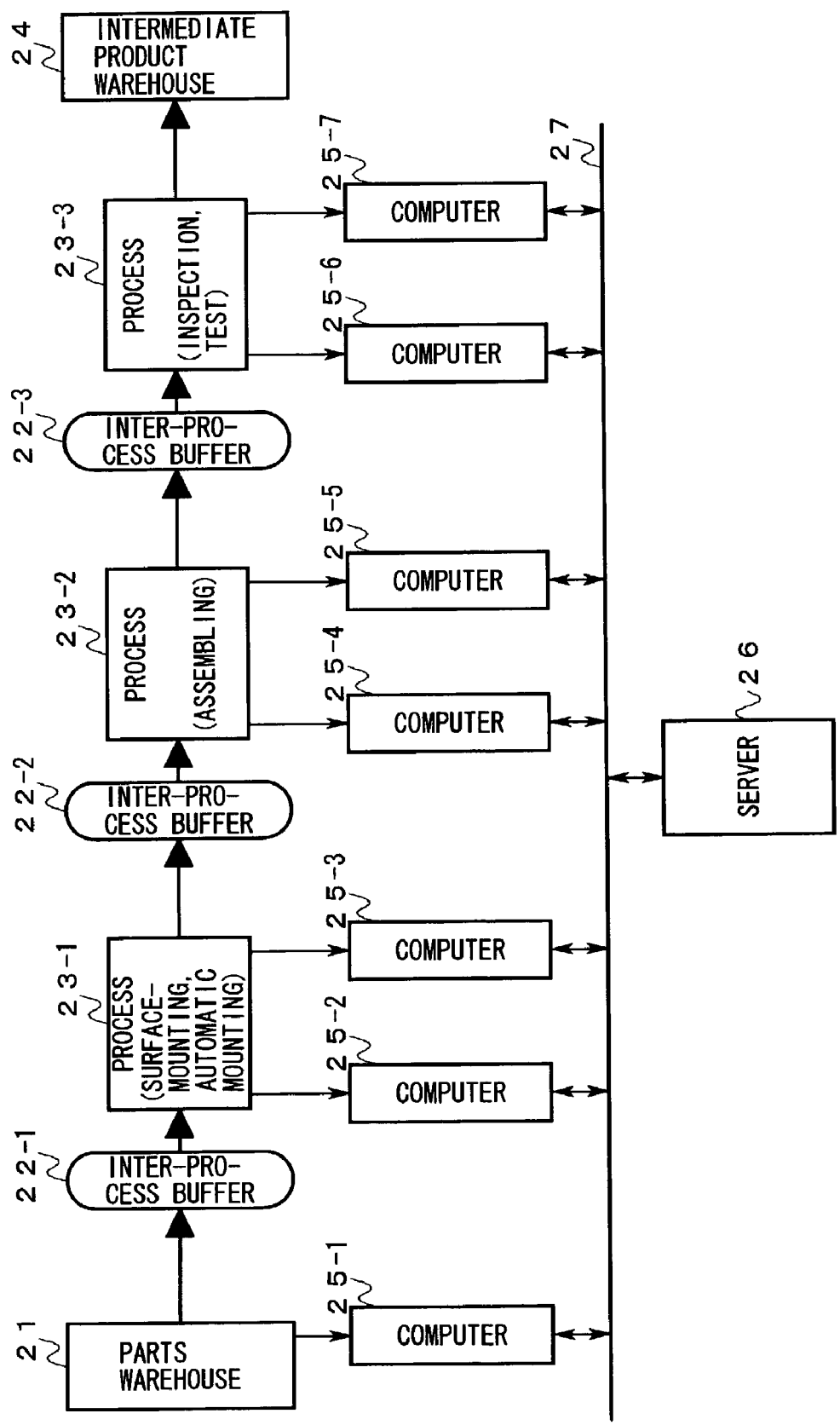
FIG. 2 is a block diagram showing an embodiment of the invention.

FIG. 2 shows an embodiment of the invention. As shown in FIG. 2, the exit of a parts warehouse 21 is connected to the input of an inter-process buffer 22-1. The output of the inter-process buffer 22-1 is connected to the entrance of an intermediate product warehouse via a process 23-1, an inter-process buffer 22-2, a process 23-2, an inter-process buffer 22-3, and a process 23-3 that are connected to each other in cascade.

A sensor (not shown) is provided at each of the exit of the parts warehouse 21 and the start points and the end points of the respective processes 23-1 to 23-3. The sensors are connected to prescribed ports of computers 25-1 to 25-7, respectively. The computers 25-1 to 25-7 and a server 26 belong to a LAN 27.

Although transport mechanisms are provided in respective sections described below, the transport mechanisms will not be described below because they are irrelevant to the invention.

Section from the exit of the parts warehouse 21 to the input of the inter-process buffer 22-1

Section from the output of the process 23-1 to the input of the inter-process buffer 22-2

Section from the output of the process 23-2 to the input of the inter-process buffer 22-3

Section from the output of the process 23-3 to the entrance of the intermediate product warehouse 24

It is assumed that the following work is performed in the processes 23-1 to 23-3:

Process 23-1: Prescribed parts are surface-mounted on a printed circuit board by an automatic mounting apparatus.

Process 23-2: The surface-mounted printed circuit board is subjected to assembling work.

Process 23-3: The printed circuit board that has been subjected to the assembling work is subjected to work relating to inspection and a test.

Figure 3:
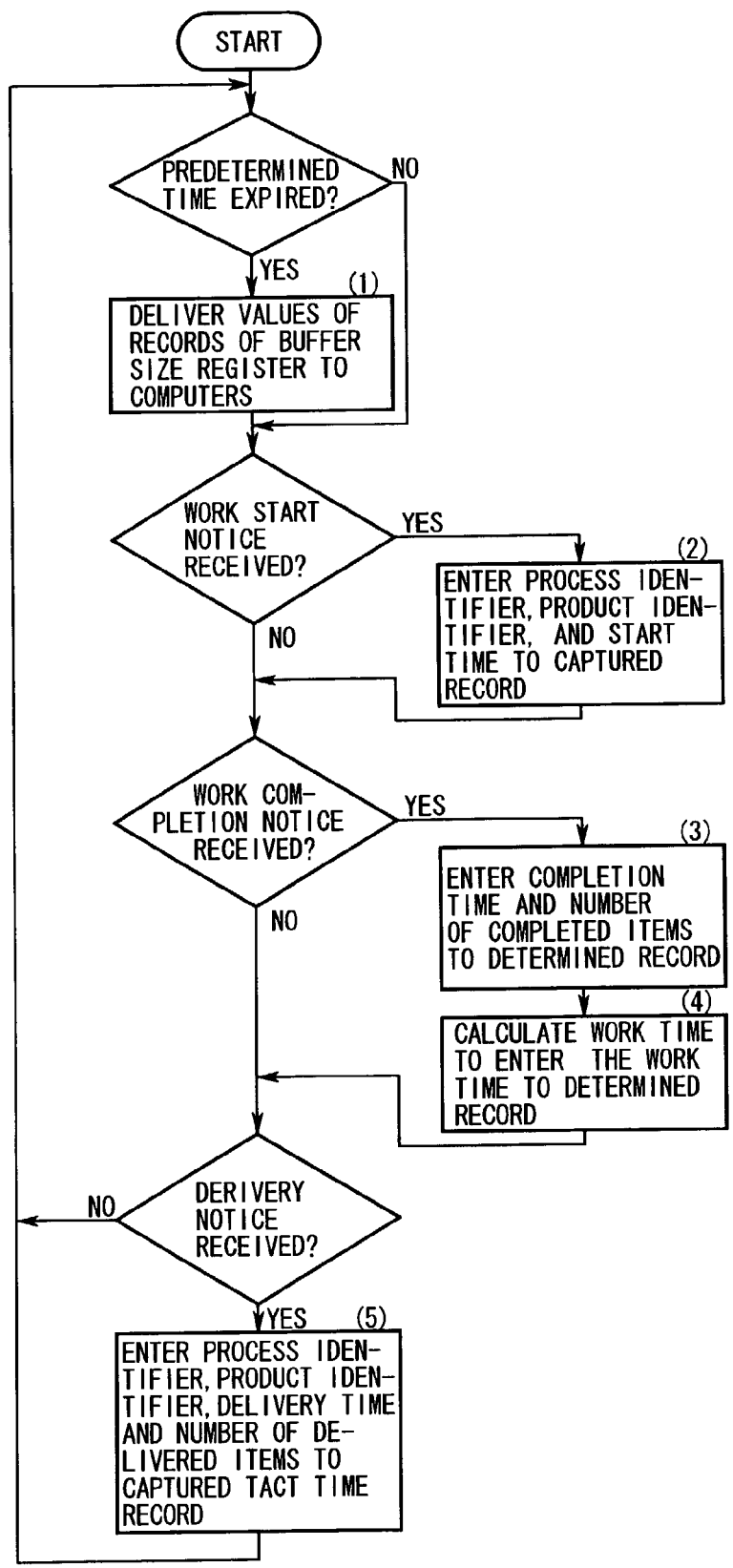
FIGS. 3 and 4 are flowcharts showing the operation of the embodiment.
Figure 4:
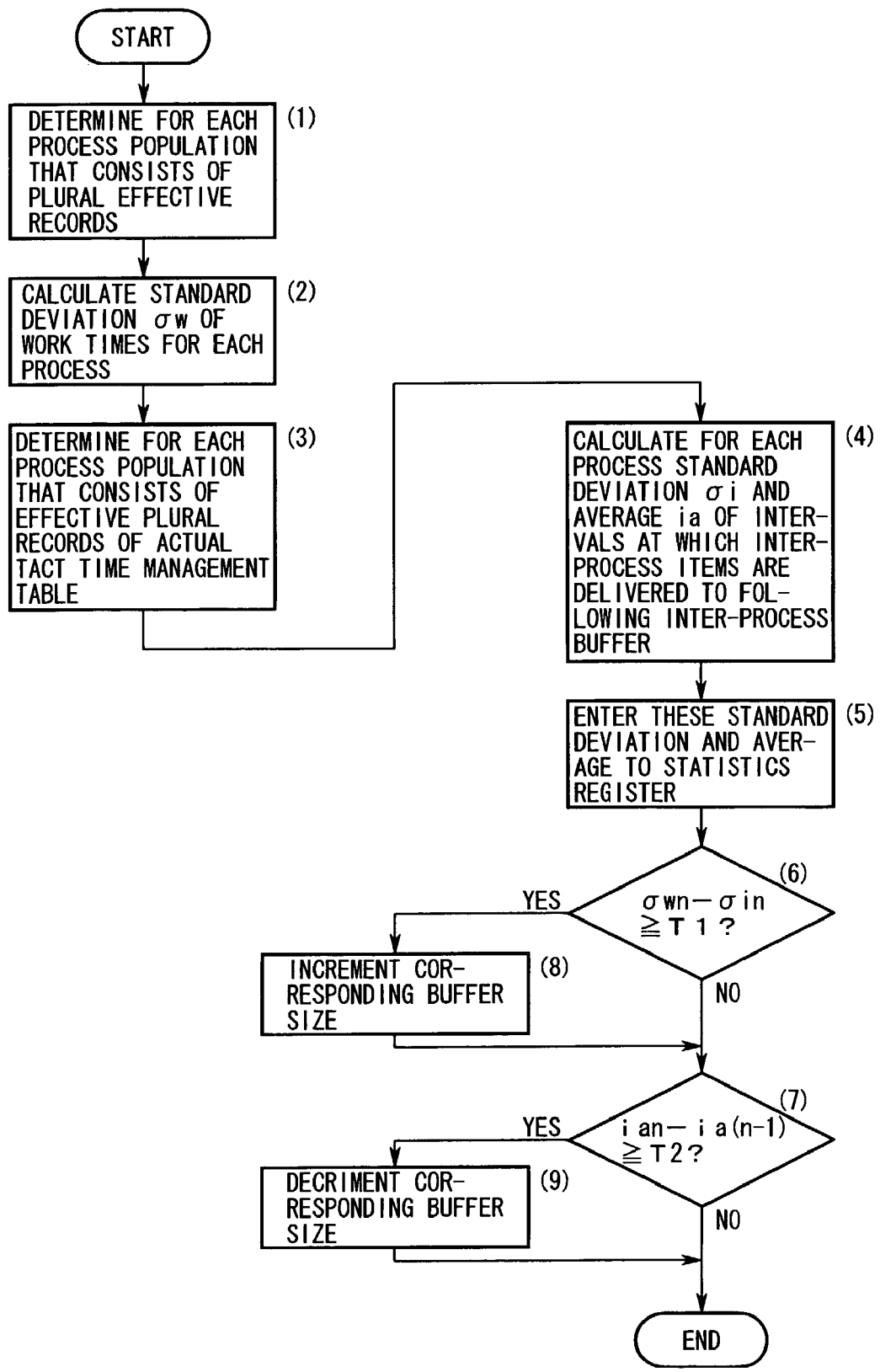
Figure 5:
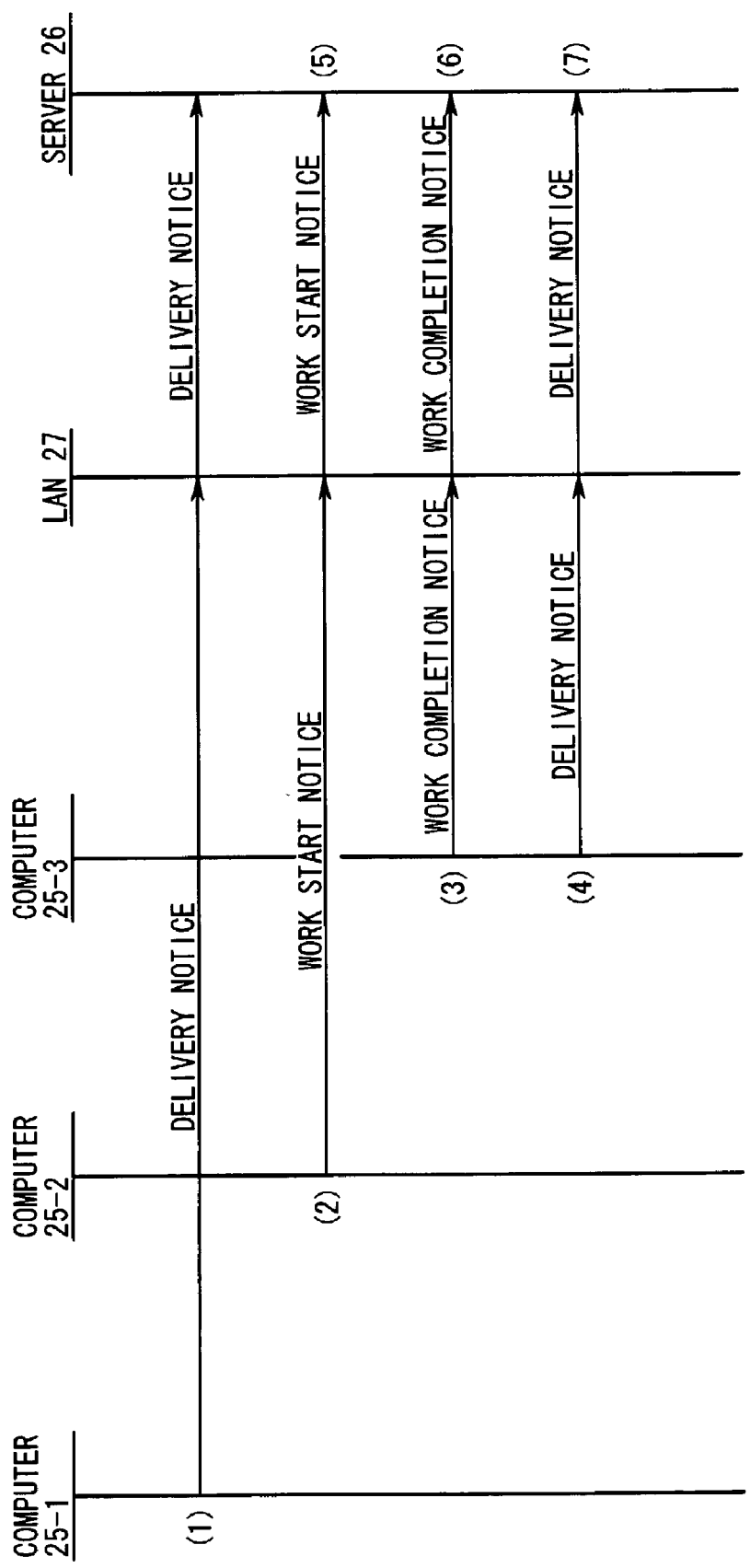
FIGS. 5 and 6 are charts illustrating the operation of the embodiment.
Figure 6:
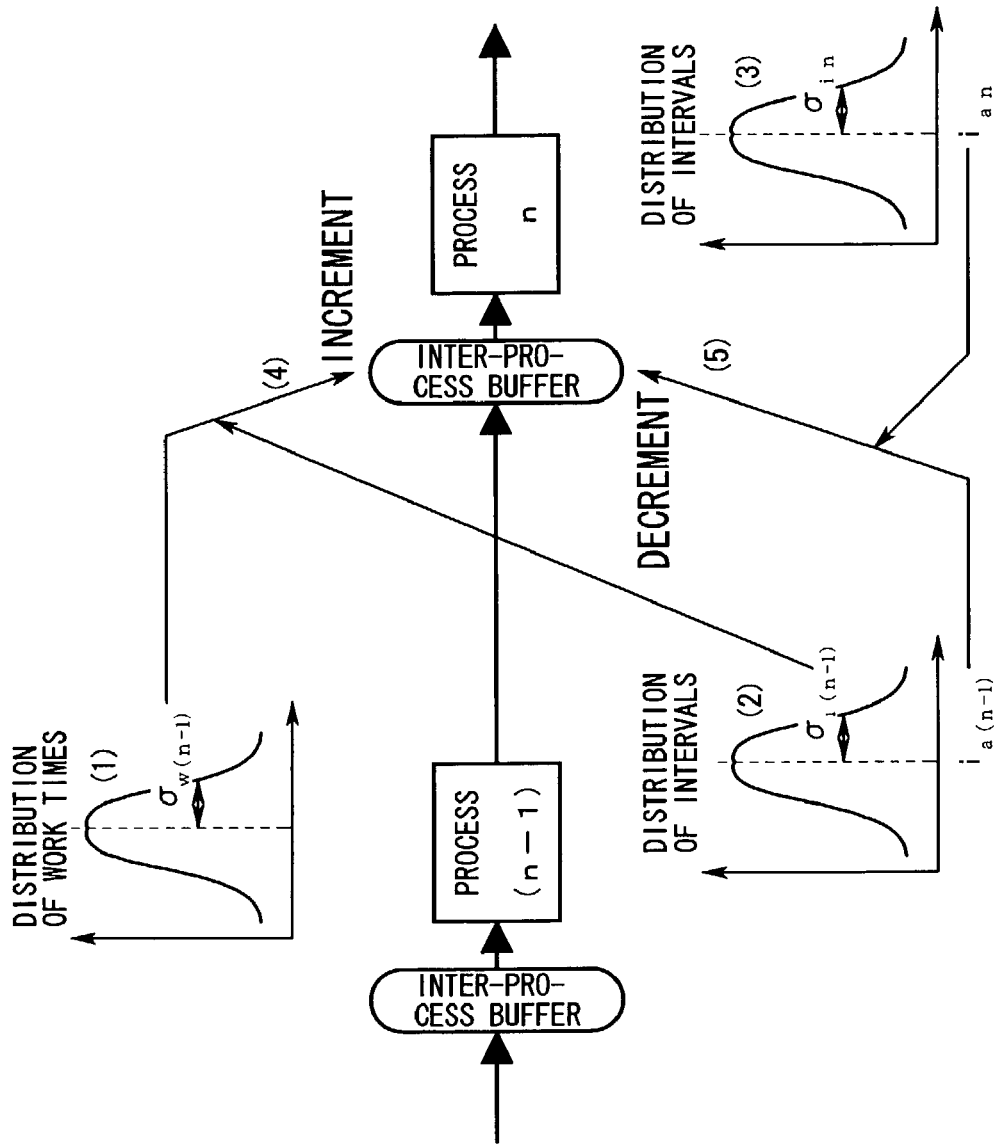

FIGS. 3 and 4 are flowcharts showing the operation of the embodiment. FIGS. 5 and 6 are charts illustrating the operation of the embodiment.

The operation of the embodiment will be described below with reference to FIGS. 2–6.

An actual tact time management table 31, a work time management table 32, a statistics register 33, and a buffer size register 34 that are shown in FIGS. 7–10, respectively, are stored in respective particular storage areas of a main storage of the server 26.

As shown in FIG. 7, the actual tact time management table 31 contains a set of records each having the following fields:

Process identifier field to contain a unique process identifier that indicates a process in which work concerned completed.

Product identifier field to contain a unique product identifier that indicates a type or the like of a product that was subjected to the work concerned.

Delivery time field to contain delivery time when work subjects that were supplied (or generated) as a result of the work concerned and were to be subjected to predetermined work in the following process was delivered to a corresponding inter-process buffer.

Number-of-delivered-items field to contain the number of delivered work subjects.

As shown n FIG. 8, the work time management table 32 contains a set of records each having the following fields:

Process identifier field to contain a unique process identifier that indicates a process in which work was performed actually.

Product identifier field to contain a unique product identifier that indicates a type or the like of a product that was subjected to the work concerned.

Start time field to contain time when the work concerned started.

End time field to contain time when the work concerned completed.

Work time field to contain time that was taken for the work concerned.

Number-of-completed-items field to contain the number of items that were subjected to the work concerned.

Figure 9:
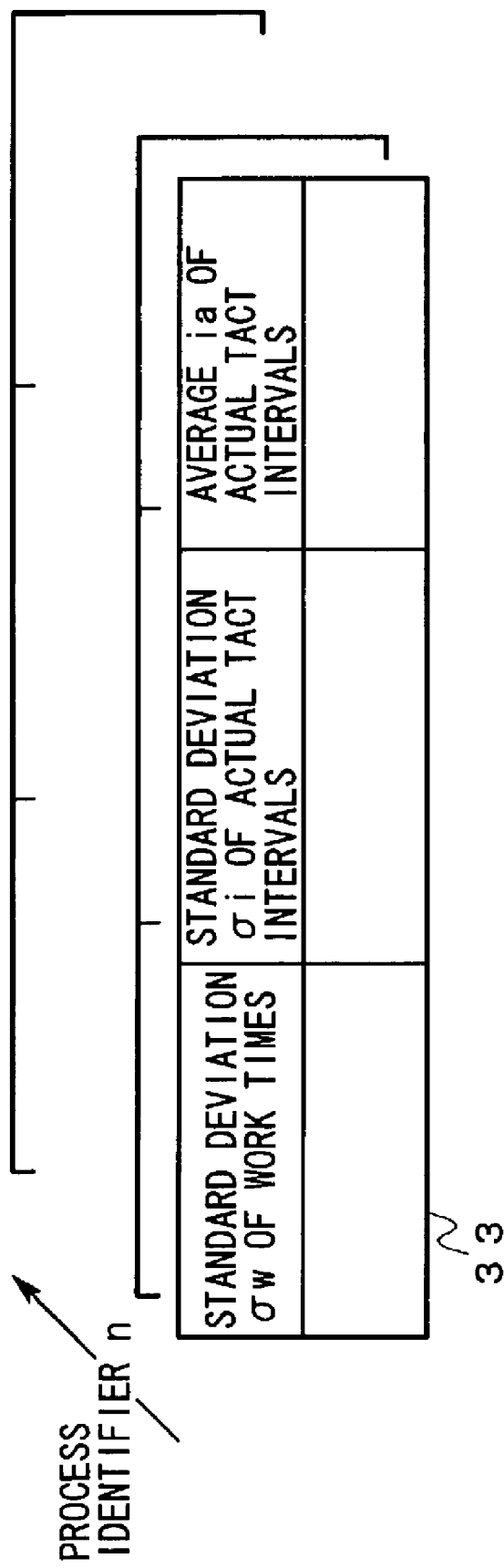
FIG. 9 shows the structure of a statistics register.

As shown in FIG. 9, the statistics register 33 contains a set of records each of which has the following fields and that correspond to the respective processes (the processes 23-1 to 23-3 plus a process in which parts are output from the parts warehouse 21; indicated by a process identifier (mentioned above)):

Standard deviation (or variance) $\sigma_w$ (described later) of work times

Figure 10:
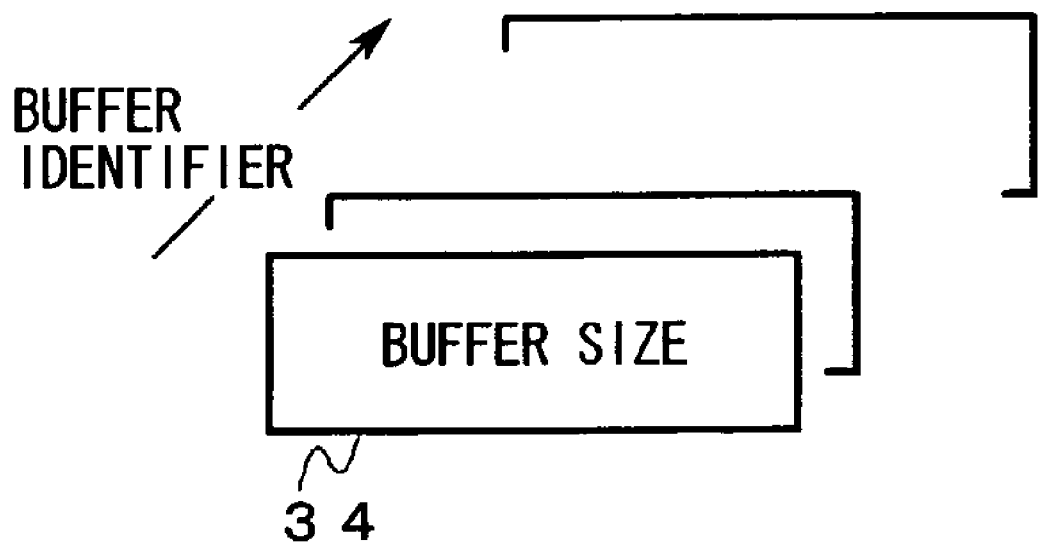
FIG. 10 shows the structure of a buffer size register.

Standard deviation (or variance) $\sigma_i$ (described later) of actual tact intervals Average $i_a$ of the actual tact intervals As shown in FIG. 10, the buffer size register 34 contains a set of single-field records each of which satisfies the following conditions. Each record corresponds to a unique buffer identifier indicating an inter-process buffer (denoted by one of symbols 22-1 to 22-3) that is provided between a process indicated by a process identifier (mentioned above) and its following process, and stores a maximum storage-allowable amount or number (hereinafter referred to as "buffer size"; assigned to the inter-process buffer indicated by the buffer identifier) of work subjects of the following process. For the sake of simplicity, it is assumed that the buffer identifiers are equal to suffixes "1" to "3" of the symbols 22-1 to 22-3, respectively.

Standard sizes (or sizes suitable for past results) that should be set for the inter-process buffers 22-1 to 22-3 at the time of a start are stored, in advance, as initial values, in the records of the buffer size register 34, respectively.

At a start and time points that come at a prescribed frequency in a steady state, the server 26 delivers the values (buffer sizes) of the records of the buffer size register 34 to the respective computers 25-1, 25-3, and 25-5 over the LAN 27 (indicated by symbol (1) in FIG. 3).

Cooperating with the computers 25-2, 25-4, and 25-6 via the LAN 27, for example, the computers 25-1, 25-3, and 25-5 allow delivery of parts and in-process items to the inter-process buffers 22-1 to 22-3 in such a range that the residual capacities of the inter-process buffers 22-1 to 22-3 do not exceed the above-delivered buffer sizes.

In a period when one of the inter-process buffers 22-1 to 22-3 is full, the associated one of the computers 25-1, 25-3, and 25-5 prohibits delivery or carrying-out for delivery of parts and in-process items to the one of inter-process buffers 22-1 to 22-3 though not imposing any restrictions on work or processing to be performed inside the parts warehouse 21 or in the processes 23-1 and 23-2.

The computer 25-1 monitors events that parts as work subjects of the process 23-1 are delivered from the parts warehouse 21 to the inter-process buffer 22-1. Every time such an event occurs, the computer 25-1 sends a notice (hereinafter referred to as "delivery notice") including the following items to the server 26 over the LAN 27 (indicated by symbol (1) in FIG. 5):

Process identifier indicating the event concerned.

Product identifier indicating parts that have been delivered.

Numbers of delivered parts indicating the numbers of parts that have been delivered.

Delivery time indicating time of the delivery.

When detecting that the process 23-1 has started predetermined work to be performed on in-process items that were stored in the in-process buffer 22-1 first, the computer 25-2 sends a notice (hereinafter referred to as "work start notice") including the following items to the server 26 over the LAN 27 (indicated by symbol (2) in FIG. 5):

Process identifier indicating the process concerned.

Product identifier indicating the in-process items the work on which has started.

Start time indicating time when the process started.

When detecting that the work to be performed on the above in-process items by the process 23-1 has completed, the computer 25-3 sends a notice (hereinafter referred to as "work completion notice") including the following items to the server 26 over the LAN 27 (indicated by symbol (3) in FIG. 5):

Process identifier indicating the process concerned.

Product identifier indicating the in-process items on which the work concerned has been performed.

Number of completed items indicating the number of in-process items concerned.

Completion time indicating time when the process completed.

Further, the computer 25-3 monitors events that in-process items as work subjects of the process 23-1 are delivered from the process 23-1 to the inter-process buffer 22-2. Every time such an event occurs, the computer 25-3 sends a notice (hereinafter referred to as "delivery notice") including the following items to the server 26 over the LAN 27 (indicated by symbol (4) in FIG. 5):

Process identifier indicating the event concerned.

Product identifier indicating in-process items that have been delivered.

Number of delivered items indicating the number of in-process items that have been delivered.

Delivery time indicating time of the delivery.

The computer 25-4 (or 25-6) sends a work start notice to the server 26 over the LAN 27 by performing the same processing as the above processing that is performed by the computer 25-2 except for the following:

Work whose start should be detected is work that is performed by the process 23-2 (23-3).

The work is performed on in-process items that were stored in the inter-process buffer 22-2 (22-3) first.

The computer 25-5 (or 25-7) sends a work completion notice and a delivery notice to the server 26 over the LAN 27 by performing the same processing as the above processing that is performed by the computer 25-3 except for the following:

Work whose completion should be detected is work that is performed by the process 23-2 (23-3).

In-process items that should be delivered are ones to become work subjects of the process 23-3 (or to be accommodated in the intermediate product warehouse 24).

When recognizing the work start notice (indicated by symbol (5) in FIG. 5), the server 26 performs the following processing:

Captures an empty record of the work time management table 32 under prescribed area management (hereinafter referred to as "captured record").

Enters the process identifier, the product identifier, and the start time that are included in the work start notice concerned in the process identifier field, the product identifier field, and the start time field of the captured record, respectively (indicated by symbol (2) in FIG. 3).

When recognizing a work completion notice (indicated by symbol (6) in FIG. 5), the server 26 performs the following processing:

Determines, from the captured records of the work time management table 32, a record (hereinafter referred to as "determined record") the values of whose process identifier field and product identifier field are equal to the process identifier and the product identifier, respectively, that are included in the work completion notice concerned.

Enters the completion time and the number of completed items that are included in the work completion notice in the completion time field and the number-of-completed-items field of the determined record (indicated by symbol (3) in FIG. 3).

Calculates a work time as a difference between the values of the completion time field and the start time field of the determined record, and enters the calculated work time in the work time field of the determined record (indicated by symbol (4) in FIG. 3).

When recognizing a delivery notice (indicated by symbol (7) in FIG. 5), the server 26 performs the following processing:

Captures an empty record of the actual tact time management table 31 under a prescribed area management (hereinafter referred to as "captured tact time record").

Enters the process identifier, the product identifier, the delivery time, and the number of delivered items that are included in the delivery notice concerned in the process identifier field, the product identifier field, the delivery time field, and the number-of-delivered-items field of the captured tact time record (indicated by symbol (5) in FIG. 3).

The server 26 repeats the following processing at a prescribed frequency in parallel with the above processing:

Determines, from the records of the work time management table 32, under the above-mentioned area management, for each process (i.e., for each set of records having the same value in their process identifier fields), a population that consists of a prescribed number of records that are earliest in terms of the value of the completion time field and in each of which effective values are entered in all the fields (indicated by symbol (1) in FIG. 4).

Computes a standard deviation (or variance) $\sigma_w$ of work times for each process by performing, on the corresponding population, common statistical processing that does not depend on the value of the product identifier field (indicated by symbol (2) in FIG. 4 and symbol (1) in FIG. 6).

Determines, from the records of the actual tact time management table 31, under the above-mentioned area management, for each process (i.e., for each set of records having the same value in their process identifier fields), a population that consists of a prescribed number of records that are earliest in terms of the value of the delivery time field and in each of which effective values are entered in all the fields (indicated by symbol (3) in FIG. 4).

Calculates, for each process, a standard deviation (or variance) $\sigma_i$ and an average $i_a$ of intervals at which in-process items are delivered to the following inter-process buffer by performing, on the corresponding population, common statistical processing that does not depend on the value of the product identifier field (indicated by symbol (4) in FIG. 4 and symbols (2) and (3) in FIG. 6).

Enters the calculated standard deviations (variances) $\sigma_w$ and $\sigma_i$ and averages $i_a$ in the respective records of the statistics register 33 (indicated by symbol (5) in FIG. 4). In the following, to clarify the correspondence with the processes 23-1 to 23-3, these standard deviations (variances) $\sigma_w$ and $\sigma_i$ and averages $i_a$ are given suffixes n (=1 to 3) that are the same as the suffixes of the respective symbols 23-1 to 23-3.

Judges whether the following Inequalities (1) and (2) hold for each suffix n (for the sake of simplicity, it is assumed that each of numbers "1" and "2" can be suffix n) and prescribed threshold values T1 ($\geq 0$) and T2 ($\geq 0$) (indicated by symbols (5) and (6) in FIG. 4):

$$\sigma_{wn} - \sigma_{in} \geq T1 \qquad (1)$$

$$i_{an} - i_{a(n-1)} \geq T2 \qquad (2)$$

For each suffix n for which Inequality (1) holds, increments the buffer size that is entered in the nth record of the buffer size register 34 (indicated by symbol (8) in FIG. 4 and symbol (4) in FIG. 6).

For each suffix n for which Inequality (2) holds, decrements the buffer size that is entered in the nth record of the buffer size register 34 (indicated by symbol (9) in FIG. 4 and symbol (5) in FIG. 6).

That is, the size of the inter-process buffer 22-2 (or 22-3) is kept at such a value that both of the following conditions are satisfied:

The variance of intervals at which in-process items are delivered from the preceding process 23-1 (or 23-2) to the inter-process buffer 22-2 (or 22-3) does not exceed the variance of work times for the process 23-1 (23-2) by the threshold value T1 or more.

The average of intervals at which in-process items are delivered from the preceding process 23-1 (or 23-2) to the inter-process buffer 22-2 (or 22-3) does not exceed the average of intervals at which in-process items are delivered from the process 23-2 (or 23-3) to the following inter-process buffer 22-3 (or the intermediate product warehouse 24) by the threshold value T2 or more.

As described above, according to this embodiment, even in the case where the product mix and the variances of tact times of respective processes are high in the degree of variety and vary, the size of each inter-process buffer is kept at such a value as to flexibly avoid both of a useless standby time of the preceding process and an undue increase in the number of in-process items to be delivered to the process concerned.

Therefore, the embodiment makes it possible to flexibly adjust to the form of custom manufacturing or large-item-small-scale production as well as increase the production efficiency and reduce the manufacturing cost in a reliable and stable manner.

In the embodiment, the invention is applied to a production line in which prescribed parts are mounted on a printed circuit board and then assembling, testing, and other work are performed. However, the application range of the invention is not limited to such a production line. For example, the invention can be applied to any systems and processing systems as long as prescribed kinds of work are performed, with a division of work, on work subjects that are delivered from one process to another. Further, the invention can be applied to production lines of any products as long as such mass-production with a division of work is performed.

In the embodiment, the sizes of the inter-process buffers are increased or decreased by a prescribed, fixed value. However, the value of change in the sizes of inter-process buffers need not always be fixed. For example, the value may be set at a different value in accordance with the difference between the left side and the right side of Inequality (1) or (2) (i.e., how far from its satisfaction). The manner of variation of the value is not limited to a case that it increases or decreases strictly with respect to the difference; the value may increase according to a monotonically increasing (i.e., non-decreasing) function or decrease according to a monotonically decreasing (i.e., non-increasing) function. This makes it possible to increase the rise speed at a start of a production line and enables a smooth and quick response to a sudden change in product mix. Alternatively, the value may vary so as to exhibit hysteresis to avoid frequent updating of the sizes of inter-process buffers.

In the embodiment, the computers 25-1 to 25-6 that cooperate with each other via the LAN 27 perform each of the following pieces of processing:

Updating of the sizes of the inter-process buffers 22-1 to 22-3.

Updating and recognition of excess sizes of the inter-process buffers 22-1 to 22-3.

Storage, within the confines of the excess sizes of in-process items that are delivered from the preceding process or the like.

However, the above pieces of processing may be implemented by using counters (either hardware or software that is executed reliably within the confines of a surplus capacity of a general-purpose processor) whose counts are increased or decreased in response to one or both of the following events and is communicated to a prescribed operator:

Updating of the sizes of the inter-process buffers 22-1 to 22-3.

Delivery of in-process items from the inter-process buffers 22-1 to 22-3 to the following processes.

During the course of the above-mentioned processing that in-process items are delivered from the preceding process or the like within the confines of an excess size, further delivery of in-process items may be prohibited by an operator through a certain man-machine interface when there is no excess size.

In the embodiment, the standard deviations (variances) $\sigma_w$ of work times, the standard deviations (variances) $\sigma_i$ and the averages $i_a$ of intervals at which in-process items are delivered to the following processes are calculated for the respective processes at the same frequency.

However, the invention is not limited to such a configuration; that is, the standard deviations (variances) $\sigma_w$ and $\sigma_i$ and the averages $i_a$ may not be calculated (updated) at the same frequency. For example, the calculation may be omitted during periods when it is apparent that there is no probability of updating.

To optimize the form of work of each process flexibly and smoothly, the standard deviations $\sigma_w$ and $\sigma_i$ (variances) and the average $i_a$ may be initialized when necessary to values suitable for all or part of a predetermined schedule, a result of the preceding work, and a product mix.

To attain all or part of simplification of configuration, reduction in necessary capacities, and flexible adaptation to a variety of product mixes, the standard deviations $\sigma_w$ and $\sigma_i$ (variances) and the average $i_a$ may be calculated as values suitable for all or part of the number of kinds of work subjects, a lot size of work subjects to be stored in the buffer, a unit of delivery of work subjects between the processes.

In the embodiment, the invention is applied to optimize the sizes of inter-process buffers of the above-described production line. However, the application range of the invention is not limited to such a production line. For example, the invention may be incorporated in software that is executed by a variety of general-purpose processors of personal computers etc. and realizes schedule management (may include production management).

Figure 11A:
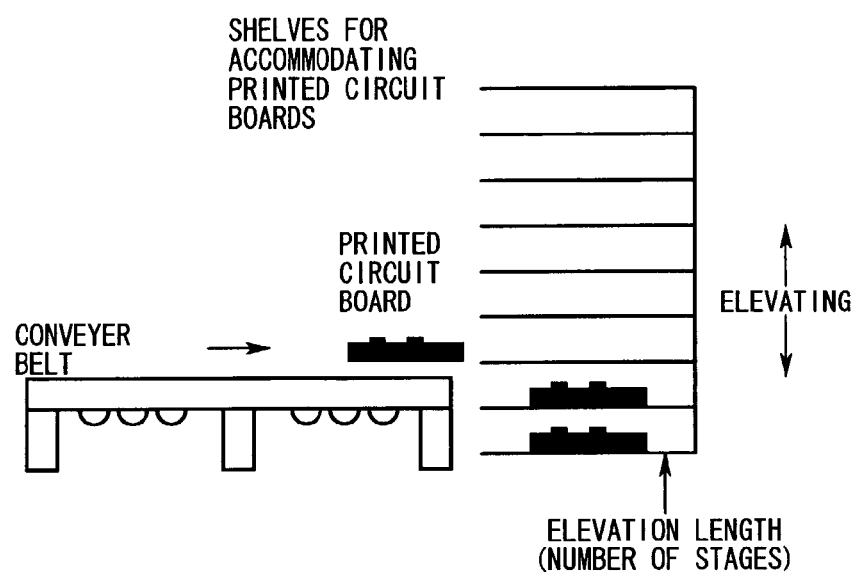

No specific configurations of the inter-process buffers 22-1 to 22-3 are described in the embodiment. However, for example, each of the inter-process buffers 22-1 to 22-3 may be any of the following inter-process buffers as long as the above-described size varying and proper man-machine interfacing therefor are performed:

An inter-process buffer (see FIG. 11A) that is composed of a plurality of shelves for accommodating individual printed circuit boards that are delivered from the preceding process by a conveyer belt and an elevator that properly places one of the shelves to accommodate an actually delivered printed circuit board at a position that is located on the extension of the conveyor belt in the neighborhood of its end. The size of the inter-process buffer is varied in accordance with the elevation length (i.e., the number of stages) of the elevator.

Figure 11B:
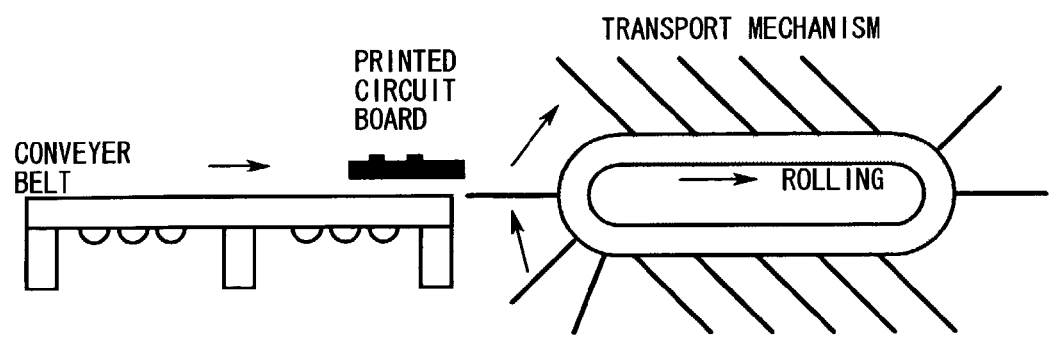

An inter-process buffer (see FIG. 11B) that is a transport mechanism composed of a rolling mechanism that is provided between the processes and tabs that are provided outside the rolling mechanism at prescribed intervals and sequentially deliver, to the following process, printed circuit boards that have been delivered from the preceding process by a conveyer belt while supporting the printed circuit boards. The size of the inter-process buffer is varied in accordance with the rotation speed of the rolling mechanism and the density of effective tabs.

Figure 12A:
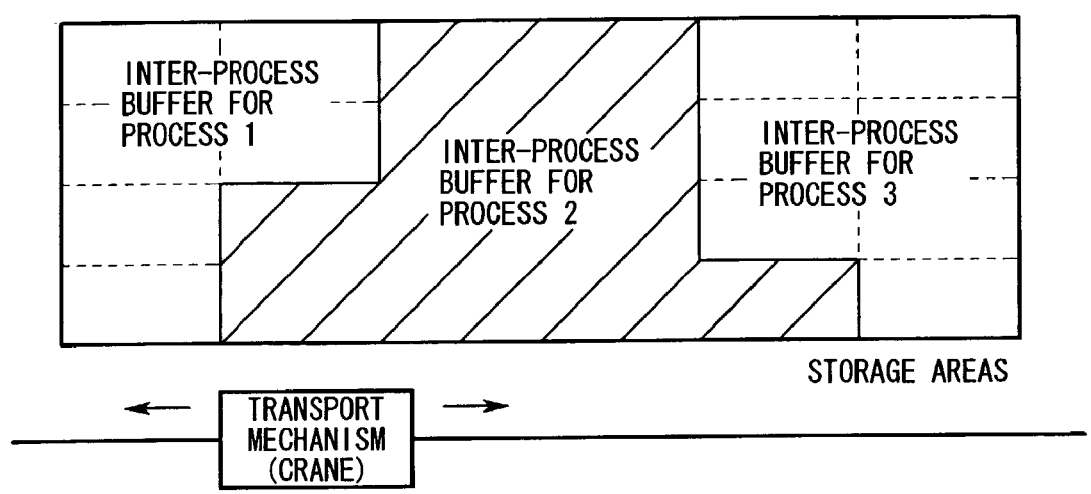

An inter-process buffer (see FIG. 12A) that is composed of a transport mechanism such as a crane and (part of) storage areas that are shared by a plurality of inter-process buffers and can be accessed freely by the transport mechanism. Part of the storage areas are assigned logically to each inter-process buffer according to instructions (suitable for the kinds, shapes, sizes, weights, etc. of in-process items) for bringing-in (or warehousing) and carrying-out (or shipment) using the transport mechanism.

Figure 12B:
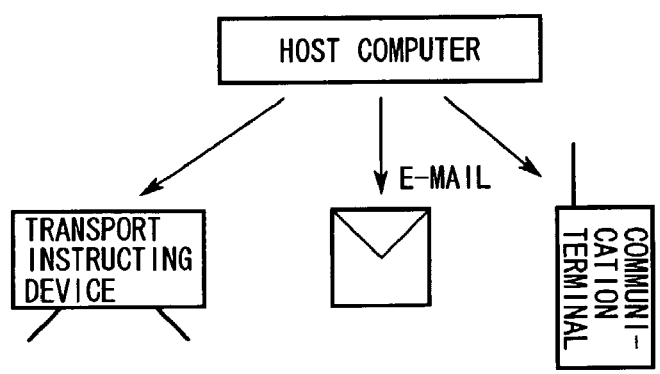

An inter-process buffer (see FIG. 12B) that is replaced by a transport instructing device that operates under the control of a host computer and informs an operator who transports in-process items of each kind about one or both of whether in-process items are allowed to be transported to the following in-process buffer and the number of in-process items whose transport should be permitted.

An inter-process buffer (see FIG. 12B) that is replaced by a communication terminal that informs, in place of the above transport instructing device, in the form of an e-mail or a voice message from a host computer, an operator about one or both of whether in-process items are allowed to be transported to the following in-process buffer and the number of in-process items whose transport should be permitted.

An inter-process buffer (see FIG. 12C) that is a conveyor belt for transporting in-process items (or products) that should be delivered to the following process such as a warehousing/shipping. The substantial size of the conveyor belt is varied in accordance with the number of items to be transported (or the capacity utilization ratio).

An inter-process buffer (see FIG. 12D) that is composed of a transport vehicle for transporting in-process items (or products) that should be delivered to the following process and a controller that plays a leading role in varying the load and the transport speed of the transport vehicle.

In the embodiment, the standard deviations (variances) $\sigma_w$ and $\sigma_i$ and the averages $i_a$ are calculated by the server 26 collectively. However, for example, the standard deviations (variances) $\sigma_w$ and $\sigma_i$ and the averages $i_a$ may be calculated under any form of distributed processing that is performed by general-purpose processors of the computers 25-1 to 25-7 etc. that perform distributed processing in cooperation with the server 26.

In the embodiment, the standard deviations (variances) $\sigma w$ and $\sigma_i$ and the averages $i_a$ may be given directly by existing facilities or may be given by utilizing excess capacities of those facilities as long as a desired frequency and accuracy are assured.

In the embodiment, flexible adaptation to a variety of needs such as moving-up or keeping of an appointed date of delivery, compression of inventory assets, streamlining of a production line, and cost reduction may be made by varying the frequency of calculation of the standard deviations (variances) $\sigma_w$ and $\sigma_i$ and the averages $i_a$ based on all or part of a manufacturing schedule, actual production, and a permutation of work subjects.

In the embodiment, a start time and a completion time of work of each process are automatically detected by a prescribed sensor or the like and communicated to the server 26 when necessary. However, one or both of a start time and a completion time may be detected manually by an operator's manipulating a switch, a bar code reader, or a like device.

No specific procedures of calculation of the averages $i_a$ are described in the embodiment. However, for example, the averages $i_a$ may be calculated by a moving average method, exponential smoothing, weighted integral, or any other proper arithmetic operation.

In the embodiment, chances of updating the size of an inter-process buffer is determined based on judgments that are made according to Inequalities (1) and (2). However, each of such judgments may be made according to a magnitude relationship between a ratio between the terms in the left side of Inequality (1) or (2) and a prescribed threshold value.

In the embodiment, the threshold values T1 and T2 are set at fixed values. However, the threshold values T1 and T2 need not always be fixed values. Flexible adaptation to a manufacturing schedule, a product mix, an event or state that occurs in each process or inter-process buffer may be made by updating the threshold values T1 and T2 as appropriate.

The invention is not limited to the above embodiments and various modifications may be made without departing from the spirit and scope of the invention. Any improvement may be made in part or all of the components.

What is claimed is:

1. An inter-process buffer controlling apparatus comprising:
   a first buffer controlling section for increasing a size of a first buffer to be used for storing subjects of predetermined work when one of a difference and a ratio between a variance of first intervals and a variance of duration exceeds a prescribed first threshold value, said first intervals being intervals with which said subjects are delivered to said first buffer, said duration being a duration taken for completing a preceding process in which said subjects are generated and delivered to said first buffer; and
   a second buffer controlling section for decreasing the size of said first buffer when one of a difference and a ratio between an average of second intervals and an average of said first intervals exceeds a prescribed second threshold value, said second intervals being intervals with which a result of said predetermined work is delivered to a second buffer for storing subjects of work succeeding said predetermined work.

2. The inter-process buffer controlling apparatus according to claim 1, wherein
   said first buffer controlling section increases the size of said first buffer by a value that is given as a monotone increasing function of a difference between said difference between the variance of said first intervals and the variance of said duration, and said prescribed first threshold value.

3. The inter-process buffer controlling apparatus according to claim 1, wherein said first buffer controlling section increases the size of said first buffer by a value that is given as a monotone non-decreasing function of a difference between said difference between the variance of said first intervals and the variance of said duration, and said prescribed first threshold value.

4. The inter-process buffer controlling apparatus according to claim 1, wherein
   said first buffer controlling section increases the size of said first buffer by a value that is given as a monotone increasing function of a ratio between said ratio between the variance of said first intervals and the variance of said duration, and said prescribed first threshold value.

5. The inter-process buffer controlling apparatus according to claim 1 wherein
   said first buffer controlling section increases the size of said first buffer by a value that is given as a monotone non-decreasing function of a ratio between said ratio between the variance of said first intervals and the variance of said duration, and said prescribed first threshold value.

6. The inter-process buffer controlling apparatus according to claim 1, wherein
   said second buffer controlling section decreases the size of said first buffer by a value that is given as a monotone decreasing function of a difference between said difference between the average of said second intervals and the average of said first intervals, and said prescribed second threshold value.

7. The inter-process buffer controlling apparatus according to claim 1, wherein
said second buffer controlling section decreases the size of said first buffer by a value that is given as a monotone non-increasing function of a difference between said difference between the average of said second intervals and the average of said first intervals, and said prescribed second threshold value.

8. The inter-process buffer controlling apparatus according to claim 1, wherein
said second buffer controlling section decreases the size of said first buffer by a value that is given as a monotone decreasing function of a ratio between said ratio between the average of said second intervals and the average of said first intervals, and said prescribed second threshold value.

9. The inter-process buffer controlling apparatus according to claim 1, wherein
said second buffer controlling section decreases the size of said first buffer by a value that is given as a monotone non-increasing function of a ratio between said ratio between the average of said second intervals and the average of said first intervals, and said prescribed second threshold value.

10. The inter-process buffer controlling apparatus according to claim 1, further comprising a statistical processing section for repeatedly determining the variance and the average of said first intervals, the variance of said duration, and the average of said second intervals.

11. The inter-process buffer controlling apparatus according to claim 10, wherein
said statistical processing section repeatedly determines the variance and the average of said first intervals, the variance of said duration, and the average of said second intervals at a frequency that is suitable for a prescribed schedule.

12. The inter-process buffer controlling apparatus according to claim 10, wherein
said statistical processing section repeatedly determines the variance and the average of said first intervals, the variance of said duration, and the average of said second intervals at a frequency that is suitable for a permutation of said subject.

13. The inter-process buffer controlling apparatus according to claim 1, wherein
the variance and the average of said first intervals, the variance of said duration, and the average of said second intervals are determined for each element of said subjects.

14. The inter-process buffer controlling apparatus according to claim 1, wherein
the variance and the average of said first intervals, the variance of said duration, and the average of said second intervals are determined for each lot of said subjects stared in said first buffer.

15. The inter-process buffer controlling apparatus according to claim 1, wherein
the variance and the average of said first intervals, the variance of said duration, and the avenge of said second intervals are determined for each unit of delivery of said subjects to said second buffer.

16. A program for causing a computer to function as all or part of a first buffer controlling section, a second buffer controlling section, and a statistical processing section which constitute an inter-process buffer controlling apparatus, wherein:
said first buffer controlling section is a section for increasing a size of a first buffer to be used for storing subjects of predetermined work when one of a difference and a ratio between a variance of first intervals and a variance of duration exceeds a prescribed first threshold value, said first intervals being intervals with which said subjects are delivered to said first buffer, said duration being a duration taken for completing a preceding process in which said subjects are generated and delivered to said first buffer;
said second buffer controlling section is a section for decreasing the size of said first buffer when one of a difference and a ratio between an average of second intervals and an average of said first intervals exceeds a prescribed second threshold value, said second intervals being intervals with which a result of said predetermined work is delivered to a second buffer for storing subjects of work succeeding said predetermined work; and
said statistical processing section is a section for repeatedly determining the variance and the average of said first intervals, the variance of said duration, and the average of said second intervals.

17. A computer-readable storage medium on which a program for causing a computer to function as all or part of a first buffer controlling section, a second buffer controlling section, and a statistical processing section is recorded, said first buffer controlling section, said second buffer controlling section, and said statistical processing section constituting an inter-process buffer controlling apparatus, wherein:
said first buffer controlling section is a section for increasing a size of a first buffer to be used for storing subjects of predetermined work when one of a difference and a ratio between a variance of first intervals and a variance of duration exceeds a prescribed first threshold value, said first intervals being intervals wit which said subjects are delivered to said first buffer, said duration being a duration taken for completing a preceding process in which said subjects are generated and delivered to said first buffer;
said second buffer controlling section is a section for decreasing the size of said first buffer when one of a difference and a ratio between an average of second intervals and an average of said first intervals exceeds a prescribed second threshold value, said second intervals being intervals with which a result of said predetermined work is delivered to a second buffer for storing subjects of work succeeding said predetermined work; and
said statistical processing section is a section for repeatedly determining the variance and the average of said first intervals, the variance of said duration, and the average of said second intervals.

18. An inter-process buffer controlling method comprising the steps of:
increasing a size of a first buffer to be used for storing subjects of predetermined work when one of a difference and a ratio between a variance of first intervals and a variance of duration exceeds a prescribed first threshold value, said first intervals being intervals with which said subjects are delivered to said first buffer, said duration being a duration taken for completing a preceding process in which said subjects are generated and delivered to said first buffer; and
decreasing the size of said first buffer when one of a difference and a ratio between an average of second intervals and an average of said first intervals exceeds a prescribed second threshold value, said second intervals being intervals with which a result of said predetermined work is delivered to a second buffer for storing subjects of work succeeding said predetermined work.

* * * * *